(12) United States Patent
Lem et al.

(10) Patent No.: US 12,337,797 B2
(45) Date of Patent: Jun. 24, 2025

(54) RACK SYSTEM FOR A COMMERCIAL VEHICLE AND METHOD FOR LATERALLY BALANCING AND LOADING OF A COMMERCIAL VEHICLE

(71) Applicant: Ford Global Technologies, LLC, Dearborn, MI (US)

(72) Inventors: Jeroen Lem, Wittem (NL); Keith Allen Godin, Dearborn, MI (US); Marcel Grein, Geilenkirchen (DE); Nicole Leonarda Wilhelmina Eikelenberg, Meerssen (NL); Johnathan Andrew Line, Northville, MI (US); Joseph Michael Kish, Canton, MI (US); Jimmy Moua, Canton, MI (US); David Longin, Herent (BE); Detlef Kuck, Inden (DE)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 17/986,116

(22) Filed: Nov. 14, 2022

(65) Prior Publication Data
US 2023/0173984 A1    Jun. 8, 2023

(30) Foreign Application Priority Data
Dec. 2, 2021    (EP) .................................... 21211918

(51) Int. Cl.
*B60R 5/04*    (2006.01)
*B60P 3/00*    (2006.01)
*B60R 5/00*    (2006.01)

(52) U.S. Cl.
CPC .............. *B60R 5/003* (2013.01); *B60P 3/007* (2013.01); *B60R 5/04* (2013.01)

(58) Field of Classification Search
CPC    B60R 5/003; B60R 5/04; B60R 5/044; B60R 5/045; B61D 37/003; B60P 3/007
See application file for complete search history.

(56) References Cited

U.S. PATENT DOCUMENTS

| 5,161,700 A | 11/1992 | Stannis et al. |
| 6,464,274 B2 | 10/2002 | Mink et al. |

(Continued)

FOREIGN PATENT DOCUMENTS

| DE | 102014001031 A1 | 7/2015 |
| DE | 102016115404 A1 | 2/2018 |

(Continued)

OTHER PUBLICATIONS

Mechanical translation of EP 1841069. (Year: 2007).*

*Primary Examiner* — John D Walters
(74) *Attorney, Agent, or Firm* — Vichit Chea; Price Heneveld LLP

(57) ABSTRACT

A rack system for a commercial vehicle including at least one guide rail fixable to at least one vehicle structure of the commercial vehicle, and at least one rack slidingly supported by the guide rail back and forth in a lateral direction of the commercial vehicle. To laterally balance a loading of the commercial vehicle the rack system comprises at least one fixing unit for temporary fixing the rack selectively in one of several fixing positions disposed along the guide rail by fixing the rack to the guide rail and/or to the vehicle structure.

20 Claims, 4 Drawing Sheets

(56) References Cited

U.S. PATENT DOCUMENTS

| | | | |
|---|---|---|---|
| 9,381,871 B2 | 7/2016 | Murray et al. | |
| 10,414,318 B2* | 9/2019 | Valtanen | B60P 1/6436 |
| 10,654,391 B2* | 5/2020 | Greiner | B60P 7/13 |
| 10,882,456 B2 | 1/2021 | Williams et al. | |
| 11,840,169 B2* | 12/2023 | Seemüller | B60P 1/5442 |
| 2008/0193247 A1 | 8/2008 | Zupancich et al. | |
| 2017/0291766 A1* | 10/2017 | Orth | G06Q 10/0832 |
| 2017/0313230 A1 | 11/2017 | Valtanen | |
| 2022/0129832 A1* | 4/2022 | Gil | G06Q 10/083 |

FOREIGN PATENT DOCUMENTS

| | | | | |
|---|---|---|---|---|
| EP | 1841069 A1 * | 10/2007 | | H03K 17/9502 |
| EP | 3112212 A1 | 1/2017 | | |
| WO | WO-8702128 A1 * | 4/1987 | | |

\* cited by examiner

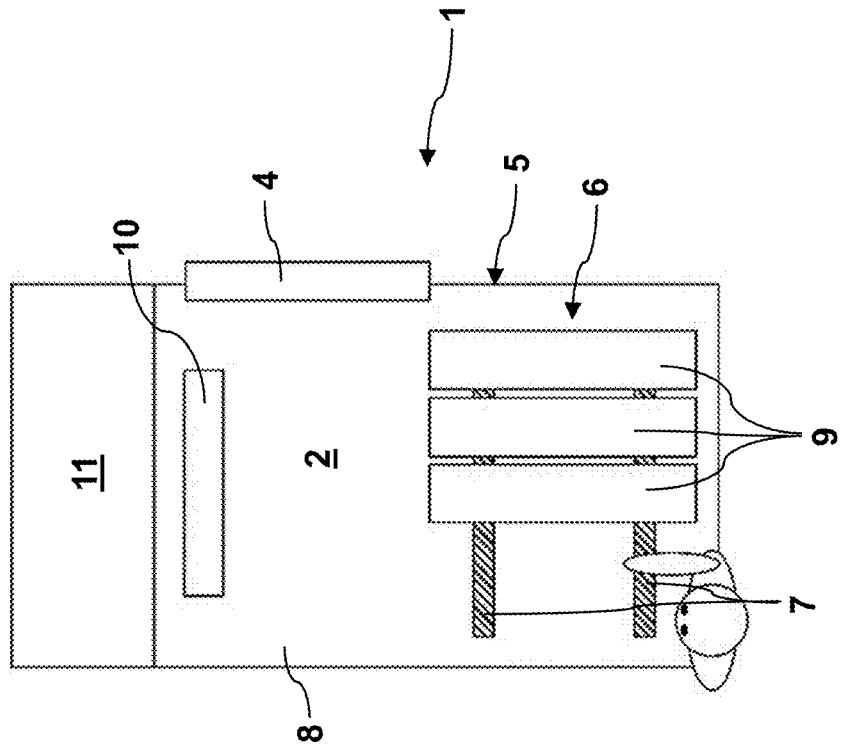
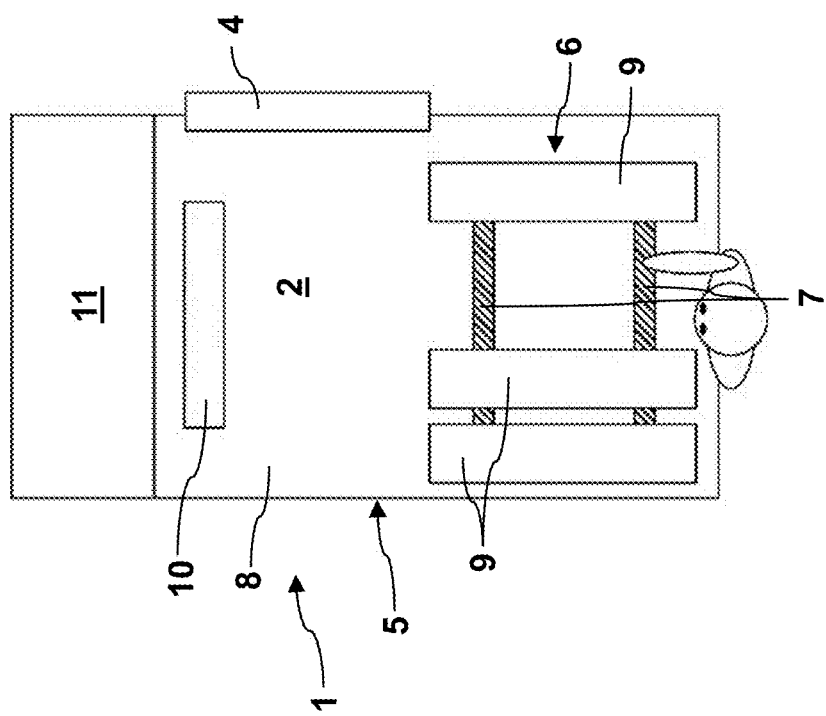

RACK SYSTEM FOR A COMMERCIAL VEHICLE AND METHOD FOR LATERALLY BALANCING AND LOADING OF A COMMERCIAL VEHICLE

CROSS-REFERENCE TO RELATED APPLICATION

This application claims foreign priority benefits under 35 U.S.C. § 119(a)-(d) to European Patent Application No. 21211918.4 filed on Dec. 2, 2021, which is hereby incorporated by reference in its entirety.

FIELD OF THE DISCLOSURE

The present disclosure generally relates to a rack system for a commercial vehicle, a commercial vehicle having a rear storage compartment, and a method for laterally balancing a loading of a commercial vehicle having a rear storage compartment.

BACKGROUND OF THE DISCLOSURE

Commercial vehicles can be used by a multitude of users with a very wide range of applications. A lot of the users place racks in a rear storage compartment of a commercial vehicle to store parts, tools and parcels, for example, which is particularly useful for a craftsman/handyman, who has a lot of items in the vehicle. Package delivery is another example where rack space is useful for all the packages.

Rack space is useful to maximize load capacity of a commercial vehicle when the user has a lot of (relatively small) items to carry in the commercial vehicle, such as a van. But not all items can be stored in a rack, as they might be too big or too heavy. This leads to a trade-off between the available rack space and space for other items in the commercial vehicle.

Conventionally, the space for racks is limited to the left-side and right-side panels of the rear storage compartment of some commercial vehicles, where on one side usually space is taken away due to a sliding door at this position. This leads to the fact that the commercial vehicle space is not completely occupied and also that the commercial vehicle is still well under its capacity.

It would be desirable to provide for a rack system for a commercial vehicle that laterally balances a loading of the commercial vehicle.

SUMMARY OF THE DISCLOSURE

According to a first aspect of the present disclosure, a rack system for a vehicle is provided. The rack system includes at least one guide rail fixable to at least one vehicle structure of the vehicle, at least one rack slidingly supported by the at least one guide rail back and forth in a lateral direction of the vehicle, and at least one fixing unit for temporary fixing the at least one rack selectively in one of several fixing positions disposed along the at least one guide rail by fixing the at least one rack to the at least one guide rail and/or to the at least one vehicle structure.

According to a second aspect of the present disclosure, a commercial vehicle is provided including a rear storage compartment, a rear load opening, at least one vehicle structure, and a rack system. The rack system includes at least one guide rail fixable to the at least one vehicle structure, at least one rack slidingly supported by the at least one guide rail back and forth in a lateral direction of the commercial vehicle, and at least one fixing unit for temporary fixing the at least one rack selectively in one of several fixing positions disposed along the at least one guide rail by fixing the rack to the at least one guide rail and/or to the at least one vehicle structure, wherein the rack system is accessible through the rear load opening.

According to a third aspect of the present disclosure, a method for laterally balancing a loading of a commercial vehicle having a rear storage compartment is provided. The method includes the steps of providing at least one rack slidingly supported back and forth in a lateral direction of the commercial vehicle by at least one guide rail fixed to at least one vehicle structure of the commercial vehicle, and temporary fixing the at least one rack selectively in one of several fixing positions disposed along the guide rail by fixing the at least one rack to the at least one guide rail and/or to the at least one vehicle structure.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 2a is a schematic top view of a further embodiment of a commercial vehicle equipped with a rack system;

FIG. 2b is a further top schematic view of the commercial vehicle equipped with the rack system shown in FIG. 2a;

DETAILED DESCRIPTION OF PREFERRED EMBODIMENTS

In the various figures, the same parts are always provided with the same reference signs, which is why they are generally described only once.

Embodiments of the disclosure are described hereinafter. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
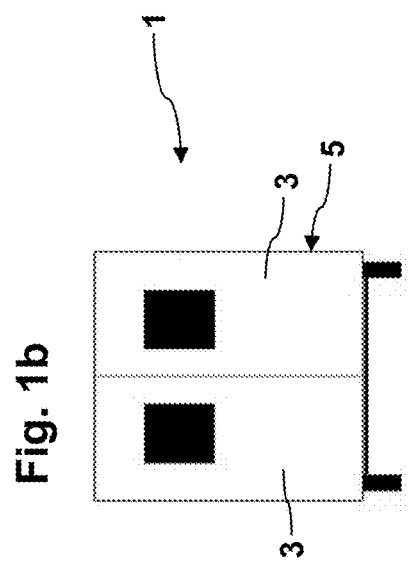
FIG. 1a is a schematic rear view of one example of a commercial vehicle shown in an unbalanced state.
Figure 1B:
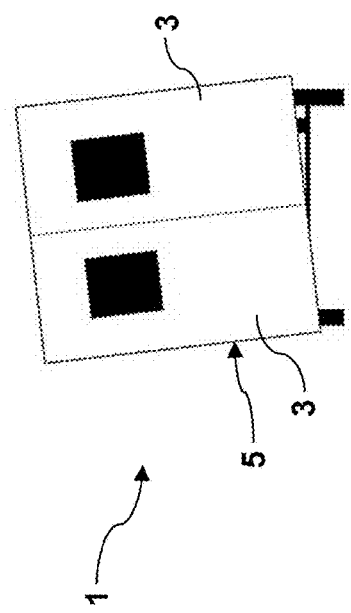
FIG. 1b is a schematic rear view of the exemplary commercial vehicle shown in a balanced state.
Figure 1C:
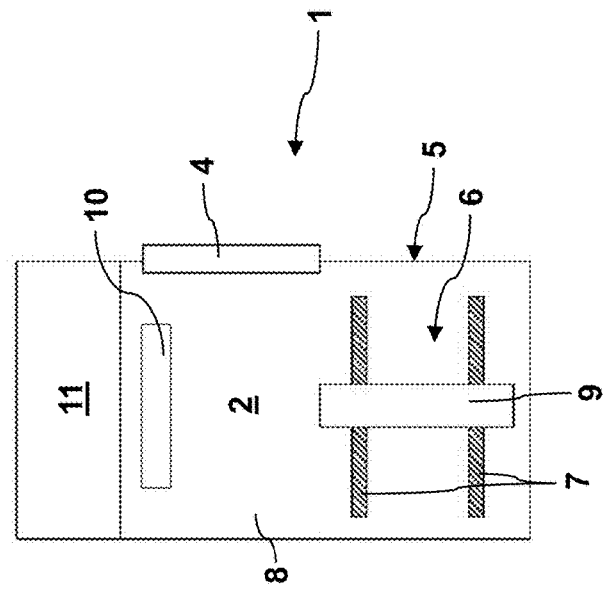
FIG. 1c is a schematic top view of an embodiment of the commercial vehicle equipped with a rack system in an unbalanced loading state.
Figure 1D:
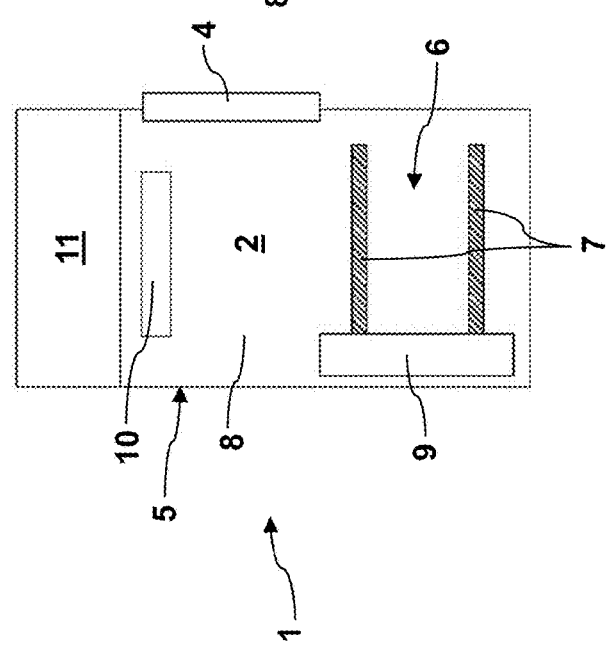
FIG. 1d is a schematic top view of the commercial vehicle equipped with the rack system shown in FIG. 1c in a balanced loading state.

FIGS. 1a and 1c show schematic views of an embodiment of a commercial vehicle 1, such as a van, in an unbalanced loading state. In FIG. 1a, the commercial vehicle 1 is shown in a schematic rear view and in FIG. 1c the commercial vehicle 1 is shown in a schematic top view. The commercial vehicle 1 has a rear storage compartment 2 that is closed at the rear end by two doors 3 as shown in FIG. 1a and laterally on one side closed by a sliding door 4 shown in FIG. 1c. The sprung mass 5 of the commercial vehicle 1 is shown leaning to the left side in FIG. 1a due to the unbalanced loading of the rear storage compartment, as shown in FIG. 1c. The commercial vehicle 1 further comprises a driver cabin 11 in front of the rear storage compartment 2 as illustrated in FIGS. 1c and 1d.

The commercial vehicle 1 comprises a rack system 6, wherein the rack system 6 is accessible through a rear load opening (not shown) of the commercial vehicle 1 being closed by the doors 3. The rack system 6 mainly extends between the rear doors 3 and the sliding door 4. In the front part of the rear storage compartment 2 there is a fixed rack 10. It should be appreciated that the rck system 6 may be employed on other types of motor vehicles such as a truck or SUV or a tractor trailer, for example.

The rack system 6 includes two guide rails 7 fixed to a floor 8 of the rear storage compartment 2 of the commercial vehicle 1. The guide rails 7 are arranged parallel to each other and laterally spaced from each other. The guide rails 7 extend in the lateral direction of the commercial vehicle 1.

Furthermore, the rack system 6 incudes a rack 9 slidingly supported by the guide rails 7 back and forth in the lateral direction of the commercial vehicle 1.

Moreover, the rack system 6 includes at least one fixing unit for temporary fixing the rack 9 selectively in one of several fixing positions disposed along the guide rails 7 by fixing the rack 9 to the guide rails 7 and/or to the floor 8.

Figure 5:
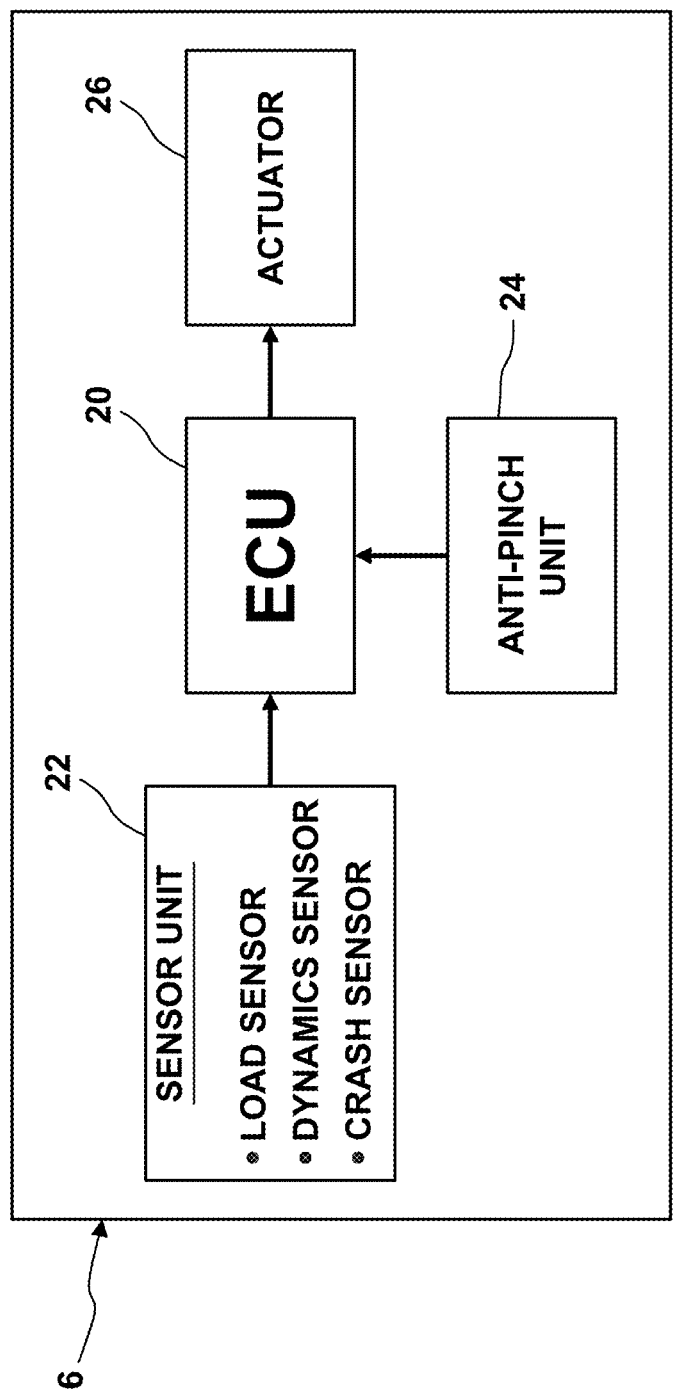
FIG. 5 is a block diagram illustrating a controller unit for controlling the rack system, according to one example.

Additionally, as illustrated in FIG. 5, the rack system 6 may include at least one electrically controllable actuator 26 for slidingly moving the rack 9 along the guide rails 7, at least one sensor unit 22 for detecting a current lateral inclination state of the commercial vehicle 1, and at least one electronic control unit (ECU) 20 suitable to control the actuator 26 according to the current lateral inclination state of the commercial vehicle 1, so that the lateral inclination of the commercial vehicle 1 becomes minimal or about zero. For this, the sensor unit may comprise at least one load sensor, at least one dynamics sensor, and/or at least one crash sensor shown in the sensor unit 22.

Further, the rack system 6 may include at least one anti-pinch unit (not shown) connected with the control unit.

FIGS. 1b and 1d show schematic views of the commercial vehicle 1 shown in FIGS. 1a and 1c in a balanced loading state. The state shown in FIGS. 1b and 1d emanates from the state shown in FIG. 1a by a lateral displacement of the rack 9 and fixation of the rack 9 in a middle position.

FIG. 2a shows a schematic view of a further embodiment of the commercial vehicle 1. The commercial vehicle 1 differs from the embodiment shown in FIGS. 1c und 1d in that the rack system 6 comprises three racks 9. To avoid repetition, reference is made to the above description of FIGS. 1c and 1d.

FIG. 2b shows a further schematic view of the commercial vehicle 1 shown in FIG. 2a. The state shown in FIG. 2b emanates from the state shown in FIG. 2a by a lateral displacement of two racks 9 to the right.

Figure 3:
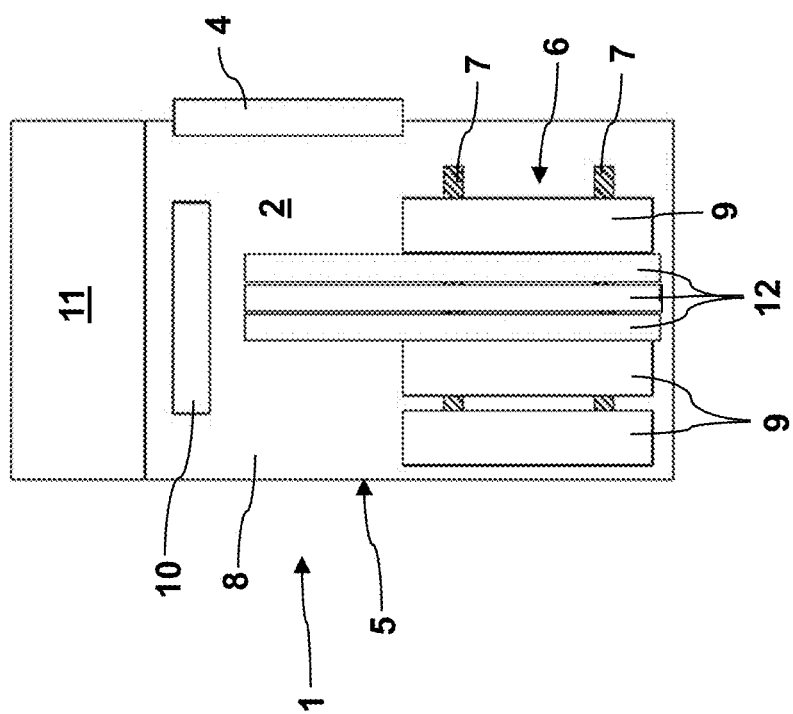
FIG. 3 is a further top schematic view of the commercial vehicle equipped with the rack system shown in FIGS. 2a and 2b.

FIG. 3 shows a further schematic view of the commercial vehicle 1 shown in FIGS. 2a and 2b. In FIG. 3 two racks are additionally used to clamp three wooden posts 12.

Figure 4:
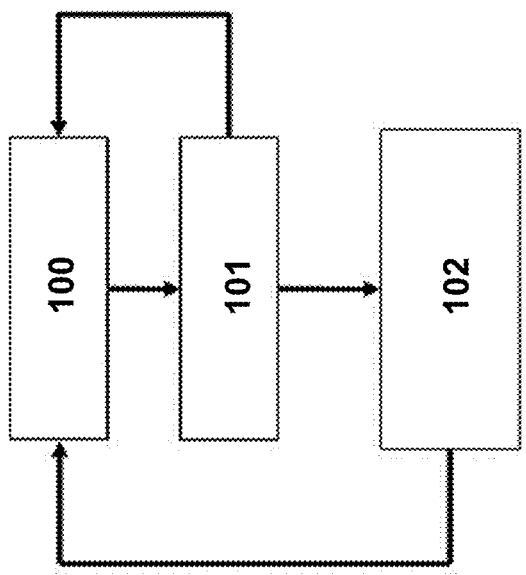
FIG. 4 is a flow chart for an embodiment of a method for laterally balancing a loading on the commercial vehicle, according to one embodiment.

FIG. 4 shows a flow chart for an embodiment of a method for laterally balancing a loading of a commercial vehicle having a rear storage compartment according to one embodiment. In method step 100 a current lateral inclination state of the commercial vehicle is detected. This can be done by monitoring the center of mass of the loaded commercial vehicle with respect to the lateral direction.

In method step 101 it is determined if the center of mass of the loaded commercial vehicle is laterally shifted so that the commercial vehicle is leaning to one side. If the center of mass of the loaded commercial vehicle is correspondingly shifted, in method step 102, at least one rack slidingly supported back and forth in a lateral direction of the commercial vehicle by at least one guide rail fixed to at least one vehicle structure of the commercial vehicle is laterally displaced and afterwards temporary fixed selectively in one of several fixing positions disposed along the guide rail by fixing the rack to the guide rail and/or to the vehicle structure. To achieve this, at least one electrically controllable actuator for slidingly moving the rack along the guide rail is controlled according to the current lateral inclination state of the commercial vehicle, so that the lateral inclination of the commercial vehicle becomes minimal or zero. If the center of mass of the loaded commercial vehicle is not correspondingly shifted the method returns to method step 100.

According to the disclosure, a rack system for a commercial vehicle includes at least one fixing unit for temporary fixing the rack selectively in one of several fixing positions disposed along the guide rail by fixing the rack to the guide rail and/or to the vehicle structure. As such, laterally balancing a loading of the commercial vehicle is achieved.

It should be noted that the features and measures listed individually in the following description can be combined with each other in any technically useful manner and show further embodiments of the disclosure. The following description additionally characterizes and specifies the rack system and method, in particular, in connection with the figures.

According to the disclosure, a loading of a commercial vehicle having a rear storage compartment can be laterally balanced by temporary fixing the rack selectively in one of several fixing positions disposed along the guide rail by fixing the rack by use of the at least one fixing unit to the guide rail and/or to the vehicle structure. Through this, the lateral weight distribution of the loaded commercial vehicle can be optimized.

Conventionally, there is often an uneven lateral weight distribution of a loaded commercial vehicle leading to one side being more loaded than the other side, wherein the commercial is leaning over toward the side that is loaded more. This leads to uneven wear and tear of commercial vehicle components, like tires, and to uneven handling characteristics of the commercial vehicle. These disadvantages could be minimized or eliminated by the rack system and method.

The simplest way to achieve the load balancing according to the disclosed example is a manual actuation of the rack, either by direct manual actuation of the rack or by indirect manual actuation on the rack by use of a mechanical actuation device of any kind such as a latch. Through this, a user can move and afterwards fix the rack in that position of the several fixing positions disposed along the guide rail that seems to the user to cause an optimal lateral weight distribution.

The guide rail can be fixed to a floor structure of the rear storage compartment of the commercial vehicle, for example. The rack system may comprise two or more guide rails arranged parallel to each other and laterally spaced from each other.

For slidingly supporting the rack by the guide rail back and forth in a lateral direction of the commercial vehicle the rack may comprise at least one carriage slidably connecting the rack with the guide rail. Therefore, the rack and the guide rail may create a sliding guide. Alternately, the rack and the guide rail may create a rolling element guide. The rack extends in the longitudinal direction of the commercial vehicle. Additionally, the rack may at least partly be extractable in the longitudinal direction of the vehicle, i.e., in a direction laterally to the guide rail. The rack system may comprise two or more racks arranged in series with respect to the guide rail, wherein the rack can be moved independently.

The fixing unit for temporary fixing the rack selectively in one of several fixing positions disposed along the guide rail by fixing the rack to the guide rail and/or to the vehicle structure can be a mechanical or electromechanical unit that can be actuated/activated manually or automatically. The fixing unit may be self-locking. For example, the fixing unit can be formed like a fixing unit of a conventional adjustment device for back and forth adjustment of a vehicle, i.e., the rack can be fixed to the guide rail at certain fixing positions arranged at equal distances from each other.

According to an advantageous embodiment, the rack system includes at least one electrically controllable actuator for slidingly moving the rack along the guide rail, at least one sensor unit for detecting a current lateral inclination state of the commercial vehicle, and at least one electronic control unit suitable to control the actuator according to the current lateral inclination state of the commercial vehicle, so that the lateral inclination of the commercial vehicle becomes minimal or zero. The electrically controllable actuator may be an electromechanical actuator with or without gear transmission. The electrically controllable actuator can act like a conventional electronic adjustment of memory vehicle seats. The sensor unit may be suitable for determining the current lateral imbalance of the loaded commercial vehicle and/or the lateral position of the center of mass of the loaded commercial vehicle. The electronic control unit controls the electrically controllable actuator until the commercial vehicle is laterally balanced as good as possible.

According to a further advantageous embodiment, the sensor unit comprises at least one load sensor, at least one dynamics sensor, and/or at least one crash sensor. The dynamics sensor can be an anti-lock braking system (ABS) sensor.

According to a further advantageous embodiment, the rack system comprises at least one anti-pinch unit connected with the control unit. Through this, there can be provided a pinch recognition, so that any motion of the rack can be stopped immediately when it is sensed that there is too much resistance to the movement of the rack. The pinch-recognition unit may have at least one sensor or may be formed to determine the current resistance value from current electric characteristics of the electrically controllable actuator. Alternatively, the anti-pinch unit can be integrated in the electronic control unit.

According to a further advantageous embodiment, the rack system comprises at least two racks slidingly supported by the guide rail and arranged in series to each other with respect to the guide rail. Depending on the manual efforts to move the racks, the rack system can be formed like a conventional library system having a wheel for each rack to drive each rack along the guide rail. By moving the racks relative to each other, the user can get access to each of the individual racks. This creates a unique solution, where a lot of rack space is created in a small volume of the rear storage compartment, optimizing the utilization rate of the commercial vehicle, and maximizing the efficiency of the user's business. Therefore, this solution also leaves a lot of floor space in the rear storage compartment for large items that can be positioned at the sliding door, for example. The rack system can be formed so that a space between the adjacent racks moved away from each other in opposite directions could be large enough for a user to walk through to the front space of the rear storage compartment. Therefore, if all racks are moved to one side, on the other side of the racks can be a path where the user could walk through. The number of racks of the rack system can be chosen depending on the required rack depth and the dimensions and amount of the cargo to be carried with the commercial vehicle. The racks could also be used and positioned to retain larger pieces of cargo between them. For example, for they could be used to clamp and therefore retain longer tubes or wooden posts. Therefore, the present embodiment provides a more efficient way of offering rack space in the commercial vehicle to get a better trade-off between the amount of racks and space for other items, to maximize the utilization rate of a rear storage compartment of the commercial vehicle.

A commercial vehicle is disclosed that may be equipped with at least one rack system according to one of the preceding embodiments or a combination of at least two of these embodiments with each other, wherein the rack system is accessible through a rear load opening of the commercial vehicle.

The advantages mentioned above with reference to the rack system are correspondingly associated with the commercial vehicle. The racks can be located in a part of the rear storage compartment that is arranged between the rear opening of the rear storage compartment and the lateral sliding door.

A method is disclosed, wherein at least one rack slidingly supported back and forth in a lateral direction of the commercial vehicle by at least one guide rail fixed to at least one vehicle structure of the commercial vehicle is temporary fixed selectively in one of several fixing positions disposed along the guide rail by fixing the rack to the guide rail and/or to the vehicle structure.

The advantages mentioned above with reference to the rack system are correspondingly associated with the method. In particular, the rack system according to one of the above-mentioned embodiments or a combination of at least two of these embodiments with each other can be used for carrying out the method.

According to an advantageous embodiment a current lateral inclination state of the commercial vehicle is detected and at least one electrically controllable actuator for slidingly moving the rack along the guide rail is controlled according to the current lateral inclination state of the commercial vehicle, so that the lateral inclination of the commercial vehicle becomes minimal or zero. The advantages mentioned above with reference to the corresponding embodiment of the rack system are correspondingly associated with the present embodiment.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A rack system for a vehicle, the rack system comprising:
   at least one guide rail fixable to at least one vehicle structure;
   a series of racks slidingly supported by the at least one guide rail back and forth in a lateral direction of the vehicle;
   a fixing unit for temporarily fixing at least one of the racks selectively in one of several fixing positions disposed along the guide rail;
   an electrically controllable actuator for slidingly moving at least one of the racks along the guide rail;
   a sensor unit for detecting at least a current lateral inclination state of the vehicle; and
   an electronic control unit configured to control the actuator according to the current lateral inclination state of the vehicle, so that the lateral inclination of the vehicle is minimized by movement of the rack.

2. The rack system according to claim 1, wherein the sensor unit comprises at least one of a load sensor, a dynamics sensor, or a crash sensor.

3. The rack system according to claim 1 further comprising an anti-pinch unit connected with the electronic control unit for determining a pinch.

4. The rack system according to claim 3, wherein the anti-pinch unit determining a pinch includes allowing the rack system to be used as a clamp to retain cargo.

5. The rack system according to claim 1, wherein the rack system includes a first guide rail, and a second guide rail spaced in a longitudinal direction of the vehicle from the first guide rail, and wherein the first and second guiderails slidingly support each of the racks separately at substantially distal ends of the rack.

6. The rack system according to claim 1, wherein the fixing unit temporarily fixes the rack in the fixing position by fixing the rack to the guide rail.

7. The rack system according to claim 1, wherein the fixing unit temporarily fixes the rack in the fixing position by fixing the rack to the vehicle structure.

8. The rack system according to claim 1, wherein at least one of the racks is partly extractable from the rear storage compartment of the vehicle in a direction laterally to the guide rail.

9. A commercial vehicle comprising:
   a rear storage compartment; and
   a rack system comprising:
     at least one guide rail fixable to a vehicle structure within the rear storage compartment;
     a series of racks slidingly supported by the guide rail back and forth in a lateral direction of the commercial vehicle; and
     a fixing unit for temporarily fixing at least one of the racks selectively in one of several fixing positions disposed along the guide rail;
     an electrically controllable actuator for slidingly moving at least one of the racks along the guide rail;
     a sensor unit for detecting at least a current lateral inclination state of the vehicle; and
     an electronic control unit configured to control the actuator according to the current lateral inclination state of the vehicle, so that the lateral inclination of the vehicle is minimized by movement of the rack.

10. The commercial vehicle according to claim 9, wherein the sensor unit comprises at least one of a load sensor, a dynamics sensor, or a crash sensor.

11. The commercial vehicle according to claim 9 further comprising an anti-pinch unit connected with the electronic control unit for determining a pinch.

12. The commercial vehicle according to claim 11, wherein the anti-pinch unit determining a pinch includes allowing the rack system to be used as a clamp to retain cargo.

13. The commercial vehicle according to claim 9, wherein the rack system includes a first guide rail, and a second guide rail spaced in a longitudinal direction from the first guide rail, and wherein the first and second guiderails slidingly support each of the racks separately at substantially distal ends of the rack.

14. The commercial vehicle according to claim 9, wherein the fixing unit temporarily fixes the rack in the fixing position by fixing the rack to the guide rail.

15. The commercial vehicle according to claim 9, wherein the fixing unit temporarily fixes the rack in the fixing position by fixing the rack to the vehicle structure.

16. The commercial vehicle according to claim 9, wherein at least one of the racks is partly extractable from the rear storage compartment of the vehicle in a direction laterally to the guide rail.

17. A method for laterally balancing a loading of a commercial vehicle having a rear storage compartment, the method comprising:
   providing a rack slidingly supported back and forth in a lateral direction of the commercial vehicle by at least one guide rail fixed to a vehicle structure;
   providing a fixing unit for temporarily fixing the rack;
   providing an electronic control unit coupled with a sensor unit and an electrically controllable actuator;
   detecting a current lateral inclination state of the commercial vehicle with the sensor unit;
   controlling the electrically controllable actuator with the electronic control unit according to the current lateral inclination state of the commercial vehicle to slidingly move the rack along the guide rail into one of several fixing positions disposed along the guide rail so that a lateral inclination of the commercial vehicle is minimized by movement of the rack; and
   fixing the in the fixing position with the fixing unit.

18. The method according to claim 17 further comprising:
   providing an anti-pinch unit connected with the electronic control unit;
   determining a pinch with the anti-pinch unit; and
   controlling the electrically controllable actuator in response to the pinch with the electronic control unit to stop motion of the rack.

19. The method according to claim 17, wherein fixing the rack in the fixing position with the fixing unit includes fixing the rack to the guide rail.

20. The method according to claim 17, wherein fixing the rack in the fixing position with the fixing unit includes fixing the rack to the vehicle structure.

* * * * *

UNITED STATES PATENT AND TRADEMARK OFFICE
CERTIFICATE OF CORRECTION

PATENT NO. : 12,337,797 B2
APPLICATION NO. : 17/986116
DATED : June 24, 2025
INVENTOR(S) : Lem et al.

Page 1 of 1

It is certified that error appears in the above-identified patent and that said Letters Patent is hereby corrected as shown below:

In the Claims

Column 8:
Claim 17, Line 53;
"fixing the" should be — fixing the rack —

Signed and Sealed this
Twelfth Day of August, 2025

Coke Morgan Stewart
*Acting Director of the United States Patent and Trademark Office*